(12) United States Patent
Robertson et al.

(10) Patent No.: US 11,902,765 B2
(45) Date of Patent: *Feb. 13, 2024

(54) METHODS AND SYSTEMS FOR ADAPTIVE CONFIGURING AUDIO SETTINGS BASED ON PRE-SET MAPPING DATA (71) Applicant: Voyetra Turtle Beach, Inc., Valhalla, NY (US)

(72) Inventors: Kevin Arthur Robertson, San Jose, CA (US); David Gallagher, San Jose, CA (US); Nicholas Richard Bourne, San Diego, CA (US)

(73) Assignee: VOYETRA TURTLE BEACH, INC., Valhalla, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/665,619

(22) Filed: Oct. 28, 2019

(65) Prior Publication Data

US 2020/0068331 A1 Feb. 27, 2020

Related U.S. Application Data

(63) Continuation of application No. 14/814,012, filed on Jul. 30, 2015, now Pat. No. 10,462,593.

(Continued)

(51) Int. Cl.
*H04S 3/02* (2006.01)
*H04S 7/00* (2006.01)
(Continued)

(52) U.S. Cl.
CPC ............... *H04S 3/02* (2013.01); *G09G 5/006* (2013.01); *H04L 67/00* (2013.01); *H04L 67/34* (2013.01);
(Continued)

(58) Field of Classification Search
CPC ............ H04S 3/02; H04S 3/004; H04S 7/307; G09G 5/006; H04L 67/08; H04L 67/34;
(Continued)

(56) References Cited

U.S. PATENT DOCUMENTS 6,263,502 B1 * 7/2001 Morrison ................. H04N 5/44
348/563
8,942,385 B1 * 1/2015 Jones .................... H04R 1/1041
381/74

(Continued)

FOREIGN PATENT DOCUMENTS

EP 2675187 12/2013
JP 0135451 B1 * 4/1998

OTHER PUBLICATIONS

Turtle Beach, NPL, Advanced Sound editor User Guide (Year: 2012).*

(Continued)

*Primary Examiner* — Carolyn R Edwards
*Assistant Examiner* — Kuassi A Ganmavo
(74) *Attorney, Agent, or Firm* — McAndrews, Held & Malloy, Ltd.

(57) ABSTRACT

Methods and systems are provided for matrixed audio settings. In an audio system that includes at least one audio output element for outputting audio signals, a first user input that includes a selection of audio mode may be received, and based on the selected audio mode and pre-set mapping data, one or more audio settings from a plurality of audio settings supported in the system may be determined, for use during generating, processing, and/or outputting of the audio signals. The mapping data defines for each supported audio mode valid values for each of corresponding one or more audio settings from the plurality of audio settings. At least one user control element may be configured to enable receiving a second user input that includes a selection (Continued)

between the determined one or more corresponding audio settings. The audio system, or at least the audio output element thereof, may be a headset.

20 Claims, 7 Drawing Sheets

Related U.S. Application Data (60) Provisional application No. 62/186,771, filed on Jun. 30, 2015.

(51) Int. Cl.
| | |
|---|---|
| *H04L 67/08* | (2022.01) |
| *H04N 21/439* | (2011.01) |
| *H04L 67/00* | (2022.01) |
| *G09G 5/00* | (2006.01) |
| *H04N 21/436* | (2011.01) |
| *H04R 1/10* | (2006.01) |
| *H04S 3/00* | (2006.01) |

(52) U.S. Cl.
CPC ..... *H04N 21/439* (2013.01); *H04N 21/43615* (2013.01); *H04R 1/1041* (2013.01); *H04R 2420/09* (2013.01); *H04S 3/004* (2013.01); *H04S 7/307* (2013.01)

(58) Field of Classification Search
CPC ........... H04N 21/46315; H04N 21/439; H04N 21/4852; H04R 1/1041; H04R 2420/09; G06F 3/04847; G06F 3/165; G10L 19/018

See application file for complete search history.

(56) References Cited

U.S. PATENT DOCUMENTS

| | | |
|---|---|---|
| 2004/0237750 A1 | 12/2004 | Smith et al. |
| 2005/0031130 A1 | 2/2005 | Devantier et al. |
| 2005/0100312 A1 | 5/2005 | Commons et al. |
| 2007/0058033 A1* | 3/2007 | Tsai .................... H04N 21/482 348/14.05 |
| 2007/0088806 A1 | 4/2007 | Marriott et al. |
| 2008/0080720 A1* | 4/2008 | Jacob .................... H04H 60/04 381/103 |
| 2009/0024662 A1 | 1/2009 | Park et al. |
| 2009/0061944 A1 | 3/2009 | Simmons et al. |
| 2009/0215439 A1* | 8/2009 | Hamilton .............. H04M 1/605 455/418 |
| 2009/0290725 A1* | 11/2009 | Huang ................... H03G 5/165 381/103 |
| 2010/0042925 A1 | 2/2010 | DeMartin et al. |
| 2010/0128888 A1* | 5/2010 | Junge .................... H04R 5/033 381/74 |
| 2010/0303451 A1* | 12/2010 | Nakabayashi ..... H04N 21/4852 386/338 |
| 2011/0216930 A1* | 9/2011 | Kobayashi .............. H04S 7/307 381/332 |
| 2012/0014553 A1 | 1/2012 | Bonanno |
| 2012/0063615 A1* | 3/2012 | Crockett ............ G10L 21/0364 381/98 |
| 2012/0185245 A1* | 7/2012 | Kikuchi ............... H03G 3/3005 704/225 |
| 2012/0310393 A1 | 12/2012 | Stewart et al. |
| 2013/0196721 A1 | 8/2013 | Waterman et al. |
| 2013/0263721 A1 | 10/2013 | Shavit |
| 2013/0343574 A1 | 12/2013 | Muthugounder Devarajan |
| 2014/0133658 A1* | 5/2014 | Mentz .................... H04S 7/304 381/1 |
| 2014/0321662 A1 | 10/2014 | Kihm |
| 2015/0058877 A1 | 2/2015 | Lakkundi et al. |
| 2015/0205572 A1* | 7/2015 | Holmes .................. G06F 3/165 715/728 |

OTHER PUBLICATIONS

Turtle Beach, Advanced Sound Editor User Guide Owner, 2012.
Sony, MDRHW700DS_Help Guide, 2014.

* cited by examiner

METHODS AND SYSTEMS FOR ADAPTIVE CONFIGURING AUDIO SETTINGS BASED ON PRE-SET MAPPING DATA

CLAIM OF PRIORITY

This patent application is a continuation of U.S. patent application Ser. No. 14/814,012, filed on Jul. 30, 2015, which claims priority to and benefit from the U.S. Provisional Patent Application Ser. No. 62/186,771, filed on Jun. 30, 2015. Each of the above identified applications is hereby incorporated herein by reference in its entirety.

TECHNICAL FIELD

Aspects of the present application relate to audio systems and solutions, particularly with respect to headsets and use thereof. More specifically, various implementations in accordance with the present disclosure relate to methods and systems for matrixed audio settings.

BACKGROUND

Limitations and disadvantages of conventional approaches to audio processing and audio output devices will become apparent to one of skill in the art, through comparison of such approaches with some aspects of the present method and system set forth in the remainder of this disclosure with reference to the drawings.

BRIEF SUMMARY

Methods and systems are provided for matrixed audio settings, substantially as illustrated by and/or described in connection with at least one of the figures, as set forth more completely in the claims.

DETAILED DESCRIPTION

As utilized herein the terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Figure 1:
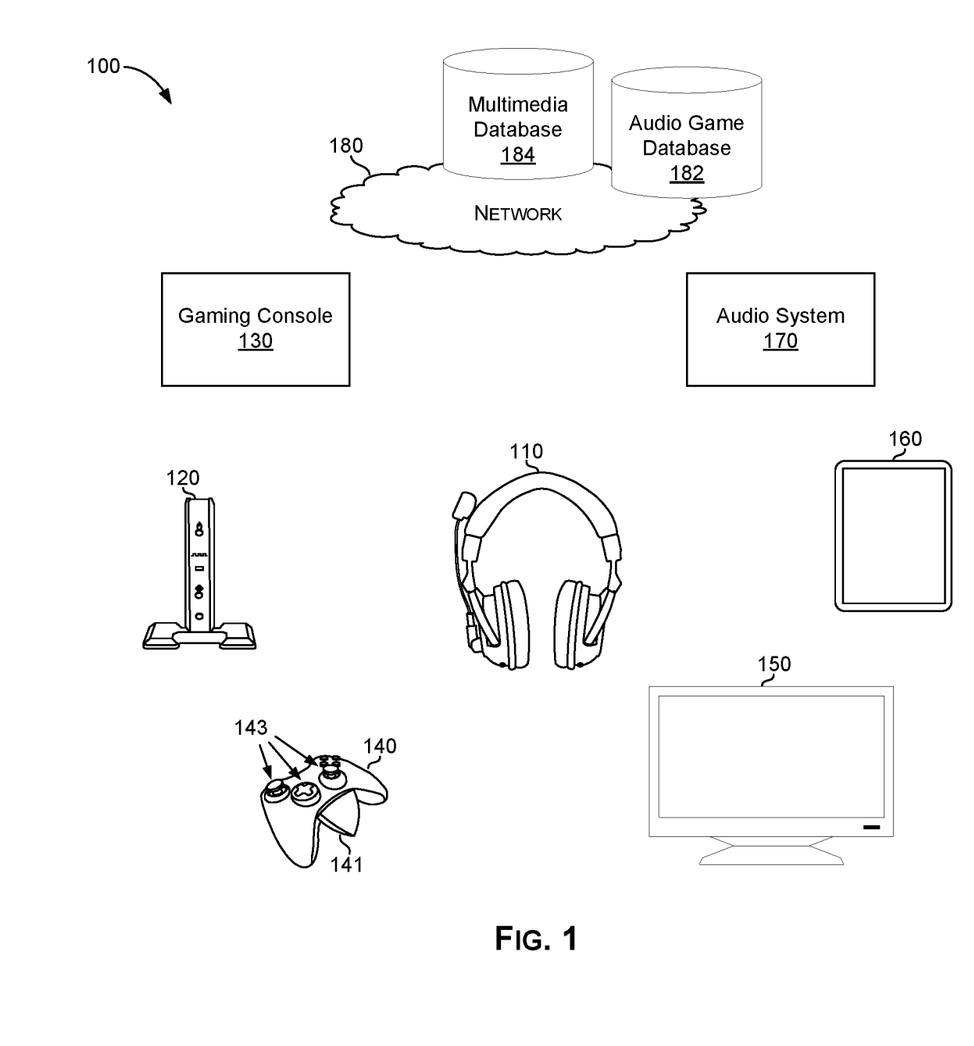
FIG. 1 depicts an example audio arrangement.

FIG. 1 depicts an example audio arrangement. Shown in FIG. 1 is an audio arrangement 100.

The audio arrangement 100 may comprise various elements which may be used in supporting and/or facilitating audio operations (e.g., outputting of audio, capturing of audio, processing of audio, storing of audio, etc.). Some of these elements may be dedicated audio elements and/or may only support or provide audio related operations or functions, whereas other elements may support and/or provide other operations or functions. For example, as shown in FIG. 1, the audio arrangement 100 may comprise a headset 110, an audio basestation 120, a gaming game console 130, a user interface device 140, a monitor 150, a multi-purpose device 160, and an audio system 170. In some instances, at least some of these elements may co-exist at a particular location (e.g., within a home). In some instances, however, the audio arrangement 100 may also comprise remote elements, which may be accessed and/or communicated with via a network 180. For example, remote resources may be used in storing (and facilitating access to) a gaming audio database 182, a multimedia database 184, etc.

The headset 110 may comprise suitable circuitry (and dedicated hardware components—e.g., speakers, microphone, buttons, sliders, etc.) for supporting audio output and/or input to the user (as well as, in some instances, other interaction functions). In particular, the headset 110 may be configured such that it may be worn by the user. The headset 110 effectively combines a headphone with a microphone (as well as some additional interface components). An example implementation of the headset 110 is described below, with reference to FIGS. 2A-2C.

The audio basestation 120 may comprise suitable circuitry for providing audio feeds to particular audio output elements (e.g., the headset 110) based on audio content provided from particular source elements (e.g., the game console 130). The audio basestation 120 may be configured, for example, to support particular interfaces/links (e.g., proprietary wireless links operating in unlicensed frequency bands) which may be supported/required by the output element but may not be supported by some of the source elements. Thus, in the example arrangement shown in FIG. 1, the basestation 120 may provide audio feeds to the headset 110 corresponding to audio outputs originating from the game console 130. Audio basestations and example implementations (e.g., circuitry) are described in more detail with respect to U.S. patent application Ser. No. 14/445,461, which is hereby incorporated herein by reference in its entirety.

The game console 130 may be a dedicated device/system used in facilitating gaming operations. The game console 130 may be, for example, a Windows computing device, a UNIX computing device, a Linux computing device, an Apple OSX computing device, an Apple iOS computing device, an Android computing device, a Microsoft Xbox, a Sony PlayStation, a Nintendo Wii, or the like. The game console 130 may comprise suitable circuitry for implementing various aspects of the present disclosure. Game consoles and example implementations (e.g., circuitry) thereof are described in more detail with respect to U.S. patent application Ser. No. 14/445,461, which is hereby incorporated herein by reference in its entirety.

The game console 130 may be used for supporting single player games and/or in multiplayer games. In this regard, multiplayer games may be played over a local area network or the internet (using the game console) with multiple players playing at the same time (in the same game). In some instances, in multiplayer games, game audio and voice may be combined and provided via an audio output (e.g., an analog or digital output audio jack for wired output or a radio for wireless output) to which a user may connect his/her headset. For example, game console 130 may send audio to the monitor 150 via link(s) 120 (e.g., S/PDIF for digital audio or "line out" for analog audio).

The user interface device 140 may be a peripheral device which may be used by the user for interfacing (e.g., input and/or output), during particular type(s) of operations. The user interface device 140 may comprise, for example, a remote controller, a game controller, a keyboard, a motion sensor/position tracker, or the like. The user interface device 140 may communicate with other elements in the arrangement via wired and/or wireless links. For example, the user interface device 140 may communicate with the game console 130 and/or the headset 110 via a wireless interface/link (e.g., Wi-Fi Direct, Bluetooth, and/or the like) and/or a wired interface/link (e.g., USB or the like).

For example, as shown in FIG. 1 the user interface device 140 may be a game controller. In this regard, the game controller 140 may have a plurality of control elements 143, which the user may use during gaming. Examples of control elements may comprise buttons, directional pads, sliders, joysticks, etc. Further, in some implementations, the game controller 140 may comprise a headset connector 141 which may be used to connect with the headset 110, such as to provide audio feeds thereto and/or receive audio inputs therefrom. The headset connector 141 may comprise suitable circuitry for supporting connectivity with the headset 110, and/or for supporting audio input/output operations based on such connectivity. The connectivity may be provided as a wired connection (e.g., using cables, cords, etc.) or may be wireless (e.g., Bluetooth, WiFi, etc.). While shown as an externally distinguishable component, the headset connector 141 need not be limited as such, and it may be embedded within the game controller 140 and/or its functions may be provided by circuitry of the game controller 140.

The monitor 150 may comprise hardware, software, and/or combination thereof for facilitating outputting of visual content (and, in some instances, audio content, such as audio corresponding to particular visual content). The monitor 108 may be, for example, a LCD, OLED, or PLASMA screen.

The multi-purpose device 160 may be, for example, a tablet computer, a smartphone, a laptop computer, or the like, and may run an operating system such as Android, Linux, Windows, iOS, OSX, or the like. Hardware (e.g., a network adaptor) and software (i.e., the operating system and one or more applications loaded onto the device 160) may configure the device 160 for operating as part of the audio arrangement 100. For example, an application running on the device 160 may cause display of a graphical user interface via which a user can access gaming-related data, commands, functions, parameter settings, etc., and via which the user can interact with the game console 130 and the other devices of the audio arrangement 100 to enhance his/her gaming experience.

The audio system 170 may be configured to handle audio content, and/or to particularly do so in an optimized manner. For example, the audio system 170 may be a dedicated home audio or multimedia system, comprising, for example, one or more speakers, electronic components (e.g., to perform amplification, equalization, mixing, etc.), cabling, etc. Such systems may be particularly used to support use of different number of audio channels (e.g., central, right/left front channels, right/left back channel, subwoofer, etc.) and/or to adjust configuration of each of the channels, thus enabling a plurality of different audio modes (e.g., mono, stereo, movie/home theater, gaming, etc.)

The various elements in the audio arrangement 100 may communicate with one another via a plurality of wired and/or wireless interface/links (not shown). Connections between the elements may be direct (peer-to-peer) and/or indirect (e.g., going through another, intermediary element, and/or through available local or remote networks). Further, each of the elements in the audio arrangement 100 may communicate with one or more others of the elements in a single-hop or multi-hop fashion. For example, the headset 110 may communicate with the audio basestation 120 in a single hop (e.g., over a proprietary RF link) and with the device (tablet) 160 in a single hop (e.g., over a Bluetooth or Wi-Fi direct link), while the tablet may communicate with audio basestation 120 in two hops via the headset 110.

As another example, the user interface device 140 may communicate with the headset 110 in a single hop (e.g., over a Bluetooth or Wi-Fi direct link) and with the device 160 in a single hop (e.g., over a Bluetooth or Wi-Fi direct link), while the device 160 may communicate with the headset 110 in two hops via the user interface device 140. These example interconnections among the elements of the audio arrangement 100 are merely examples, and any number and/or types of links among the elements of the audio arrangement 100 may be possible.

The database 182 may store gaming audio data that is accessible via the network 180. The gaming audio data may comprise, for example, signatures of particular audio clips (e.g., individual sounds or collections or sequences of sounds) that are part of the game audio of particular games, of particular levels/scenarios of particular games, particular characters of particular games, etc. Similarly, the database 182 may stores multimedia audio data that is accessible via the network 180. The multimedia audio data may comprise, for example, audio-only content (e.g., music, podcasts, etc.) and/or audio/video content (e.g., streamed movies, shows, etc.) Data in the databases 182 and/or 184 may be downloadable to, or accessed in real-time by, one of more elements of the arrangement 100.

The network 180 comprises one or more local area networks and wide area networks for enabling connectivity between remotely-located nodes. The network 180 may correspond to the Internet, with actual connectivity being provided by any suitable combination of networks and networking systems.

In an example implementation, the audio arrangement 100 (or certain elements thereof, such as the headset 110) may support adaptive and enhanced schemes for management of audio related selections by the users. For example, multi-level hierarchical selection management schemes may be used such that user selection at an initial level (e.g., selection of audio mode) may be used to adjust selection at subsequent levels (e.g., equalization (EQ) setting selection)

in a manner to include possibly applicable settings while eliminating other settings that may be not applicable (even though they are otherwise supported—that is, in different modes). This is explained in more detail below.

Figure 2A:
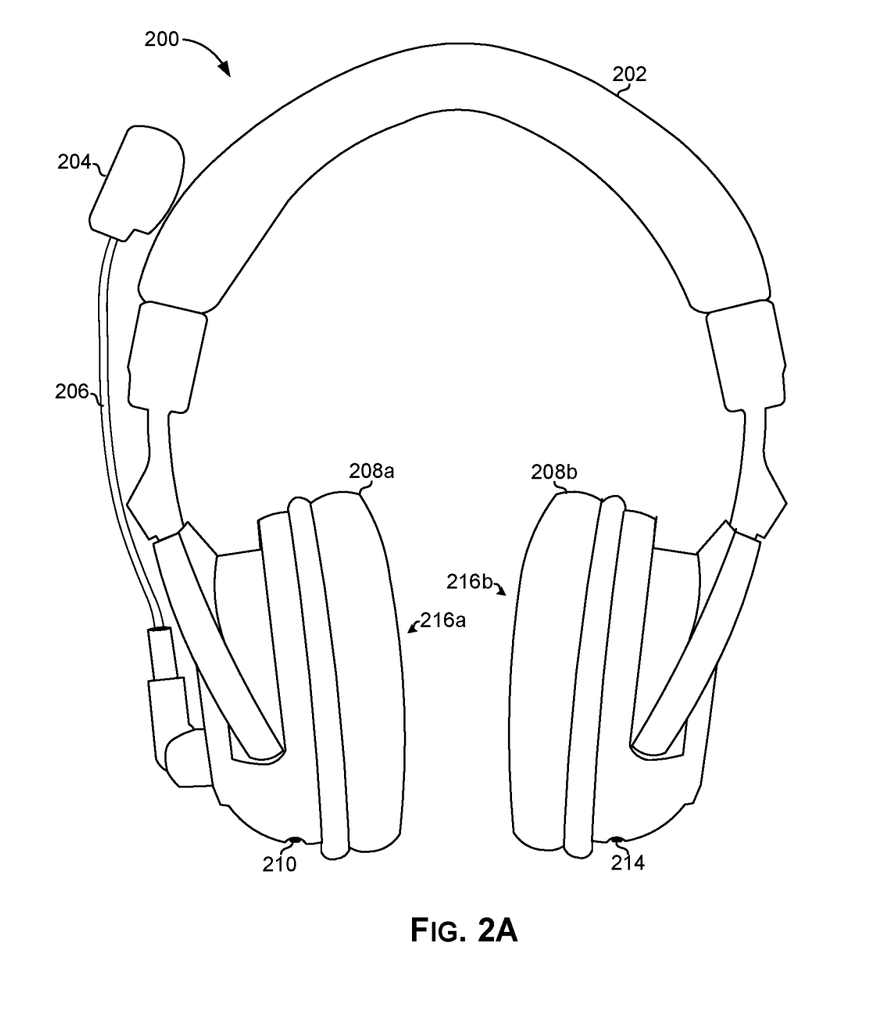
FIGS. 2A and 2B depict two views of an example implementation of a headset.
Figure 2B:
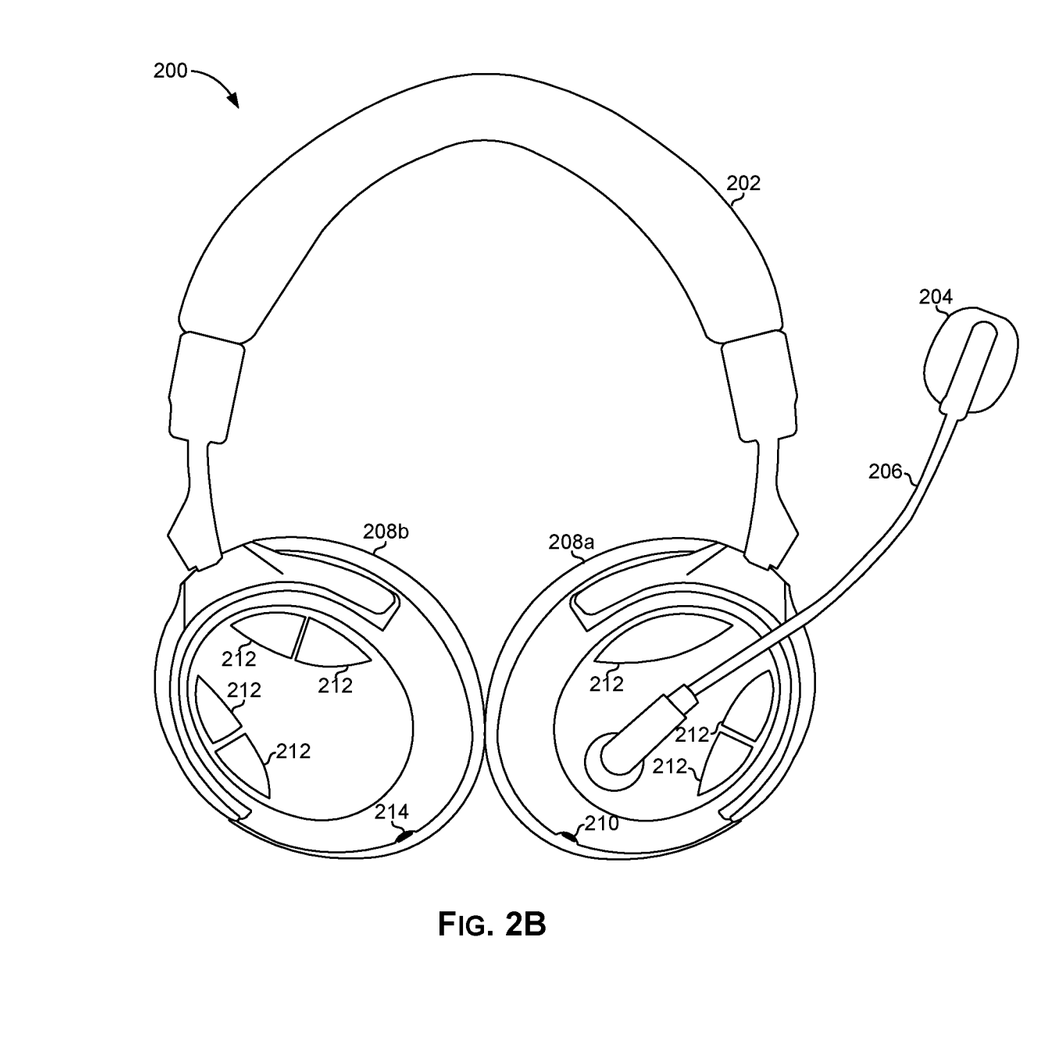

FIGS. 2A and 2B depict two views of an example implementation of a headset. Shown in FIGS. 2A and 2B are two views of an example headset 200.

The headset 200 may comprise suitable components (e.g., hardware, circuitry, software, or any combination thereof) for support audio operations (e.g., output of audio, etc.). For example, the headset 200 may correspond to a particular implementation of the headset 110 as described with respect to FIG. 1. The headset 200 comprises, for example, a headband 202, a microphone boom 206 with microphone 204, ear cups 208a and 208b which surround speakers 216a and 216b, connector 210, connector 214, and user controls 212.

The connector 210 may be, for example, a 3.5 mm headphone socket for receiving analog audio signals (e.g., receiving chat audio via an Xbox "talkback" cable).

The microphone 204 converts acoustic waves (e.g., the voice of the person wearing the headset) to electric signals for processing by circuitry of the headset and/or for output to a device (e.g., game console 130, basestation 120, a smartphone, and/or the like) that is in communication with the headset.

The speakers 216a and 216b convert electrical signals to soundwaves.

The user controls 212 may comprise dedicated and/or programmable buttons, switches, sliders, wheels, etc. for performing various functions. Example functions which the controls 212 may be configured to perform include: power the headset 200 on/off, mute/unmute the microphone 204, control gain/volume of, and/or effects applied to, chat audio by the audio processing circuitry of the headset 200, control gain/volume of, and/or effects applied to, game audio by the audio processing circuitry of the headset 200, enable/disable/initiate pairing (e.g., via Bluetooth, Wi-Fi direct, or the like) with another computing device, and/or the like.

The connector 214 may be, for example, a USB port. The connector 214 may be used for downloading data to the headset 200 from another computing device and/or uploading data from the headset 200 to another computing device. Additionally, or alternatively, the connector 214 may be used for communicating with another computing device such as a smartphone, tablet computer, laptop computer, or the like.

Figure 2C:
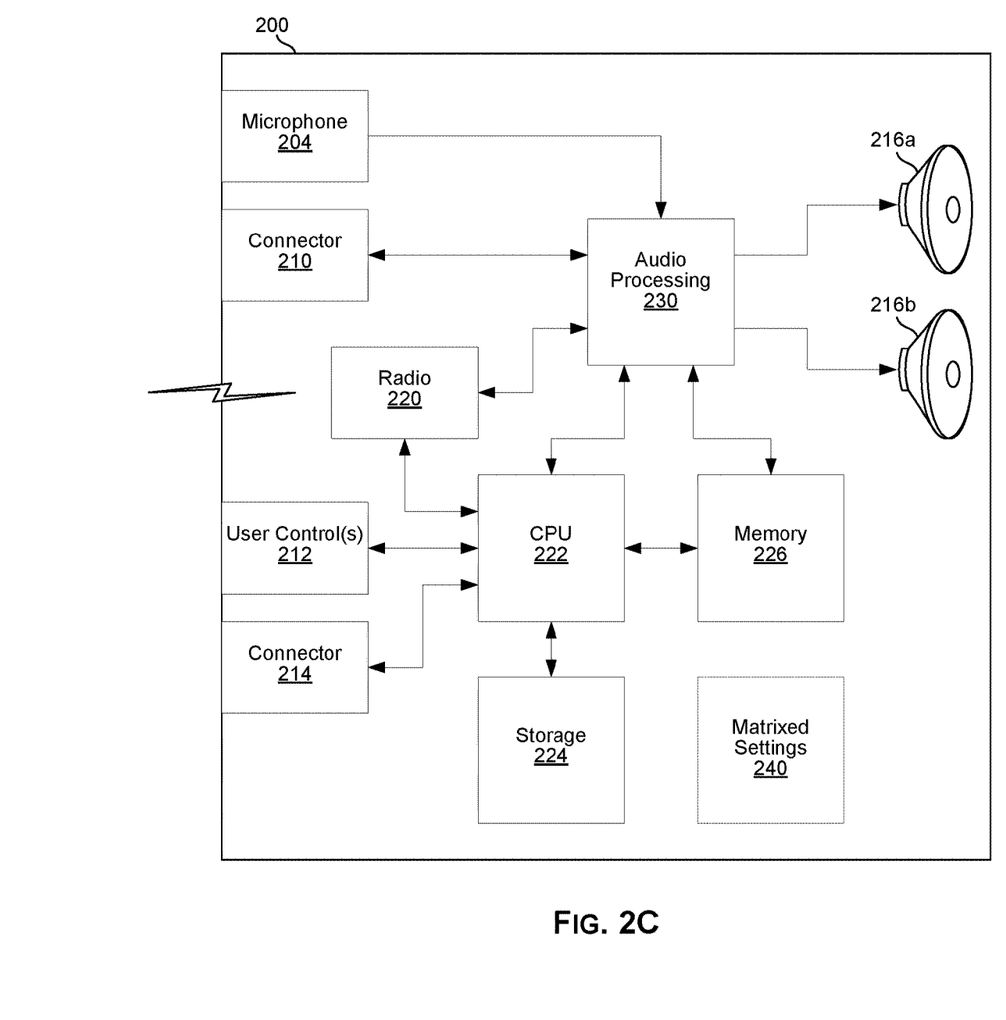
FIG. 2C depicts a block diagram of the example headset of FIGS. 2A and 2B.

FIG. 2C depicts a block diagram of the example headset of FIGS. 2A and 2B. Shown in FIG. 3C is the headset 200.

The block diagram depicted in FIG. 2C shows example circuitry (as well as additional components beyond those already described) of the headset 200. In this regard, in addition to the connector 210, the user controls 212, the connector 214, the microphone 204, and the speakers 216a and 216b already discussed, shown are a radio 220, a CPU 222, a storage device 224, a memory 226, an audio processing circuit 230, and a matrixed audio setting circuit 240.

The radio 220 may comprise circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for receiving audio from an audio basestation such as the basestation 120).

The CPU 222 may comprise circuitry operable to execute instructions for controlling/coordinating the overall operation of the headset 200. Such instructions may be part of an operating system or state machine of the headset 200 and/or part of one or more software applications running on the headset 200. In some implementations, the CPU 222 may be, for example, a programmable interrupt controller, a state machine, or the like.

The storage device 224 may comprise, for example, FLASH or other nonvolatile memory for storing data which may be used by the CPU 222 and/or the audio processing circuitry 230. Such data may include, for example, parameter settings that affect processing of audio signals in the headset 200 and parameter settings that affect functions performed by the user controls 212. For example, one or more parameter settings may determine, at least in part, a gain of one or more gain elements of the audio processing circuitry 230. As another example, one or more parameter settings may determine, at least in part, a frequency response of one or more filters that operate on audio signals in the audio processing circuitry 230.

As another example, one or more parameter settings may determine, at least in part, whether and which sound effects are added to audio signals in the audio processing circuitry 230 (e.g., which effects to add to microphone audio to morph the user's voice). Particular parameter settings may be selected autonomously by the headset 200 in accordance with one or more algorithms, based on user input (e.g., via controls 212), and/or based on input received via one or more of the connectors 210 and 214.

The memory 226 may comprise volatile memory used by the CPU 222 and/or audio processing circuit 230 as program memory, for storing runtime data, etc.

The audio processing circuit 230 may comprise circuitry operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 230 may be determined, at least in part, by which parameter settings have been selected. The processing may be performed on game, chat, and/or microphone audio that is subsequently output to speaker 216a and 216b. Additionally, or alternatively, the processing may be performed on chat audio that is subsequently output to the connector 210 and/or radio 220.

The matrixed audio setting circuit 240 may comprise suitable circuitry for supporting and/or implementing adaptive and enhanced schemes for management of audio related selections by the users in the headset 200. For example, the matrixed audio setting circuit 240 may be operable to implement a multi-level hierarchical selection management scheme to enable use of user selection (e.g., via one of the user controls 212) at an initial level (e.g., selection of audio mode) to control selections (e.g., via one or more of the user controls 212) at subsequent levels (e.g., equalization (EQ) setting selection). The use of such multi-level hierarchical selection schemes, particularly matrixed based implementations (e.g., as described below) may yield substantial improvements over existing systems and user-interface solutions. For example, the matrixed-based adaptive configuration of user controls for selections of audio EQ presets, based on selected audio mode may be substantially improved and/or optimized, such as by eliminating EQ presets (as available selections) which would not work or should not be available in particular audio mode, and/or by allowing configuration (or at least use of more descriptive labeling) of EQ presets settings for particular audio modes. In an example use scenario, e.g., a music surround mode may have such audio EQ presets as "Stadium," "Acoustic,"

and "Dance" settings; a movie surround mode may have such audio EQ presets for "Action," "Horror," "Drama" settings; a game surround mode may have such audio EQ presets for "Shooters," "Racing," "Sports," "Super Human Hearing," and "Footsteps Focus" settings; and a stereo mode may have such audio EQ presets for "Bass Boost," "Treble Boost," and "Vocal Boost" settings. Each of these labels may correlate to particular EQ presets. Further, some of these labels, while labeled differently, may correspond to the same EQ preset. Nonetheless, the more descriptive label may make it easier for the user to understand what the corresponding EQ preset provides in the particular audio mode. An example of such scheme and implementations based thereon are explained in more detail below.

Figure 3:
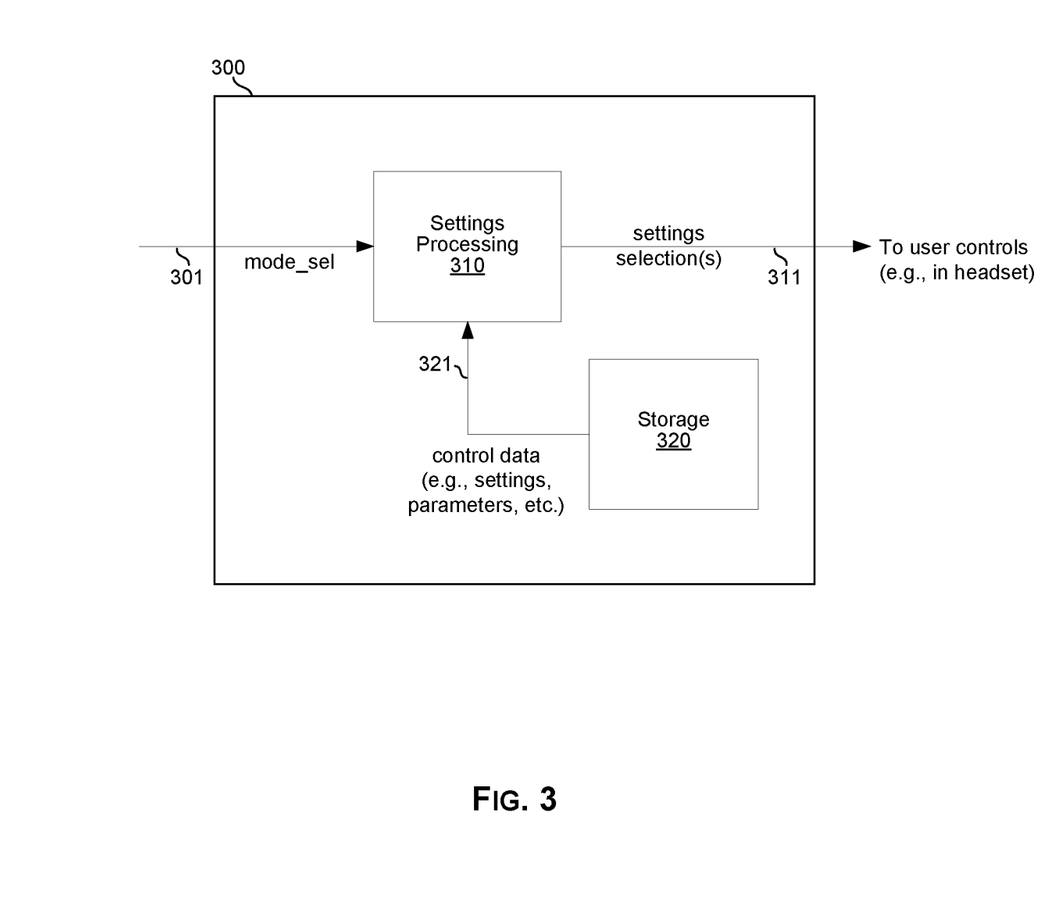
FIG. 3 depicts a block diagram of an example system for matrixed audio settings.

FIG. 3 depicts a block diagram of an example system for matrixed audio settings. Shown in FIG. 3 is an example system 300.

The system 300 may comprise suitable circuitry for implementing various aspects of the present disclosure. In particular, the system 300 may be configured to support use of matrixed audio settings management. The system 300 may be implemented in, or integrated into, one or more elements in an audio system comprising at least one audio output element. For example, as noted with respect to audio arrangement 100 shown in FIG. 1, the system 300 may be implemented in, or integrated into, one or more of the headset 110, the audio basestation 120, the gaming game console 130, the user interface device 140, the monitor 150, the multi-purpose device 160, and the audio system 170. In some implementations, the system 300 may be realized with a microprocessor configured to execute instructions located in a memory. Other implementations are also possible (e.g., DSP, ASIC, or other analog and/or digital circuitry).

In the example implementation shown in FIG. 3, the system 300 may comprise a settings processing circuit 310 and a storage circuit 320. The settings processing circuit 310 may be operable to process one or more inputs, comprising at least one input (e.g., input 301) that comprises a selection of audio mode, to determine one or more corresponding settings which may be used or applied during processing (e.g., including generation) and/or outputting of audio signals during operations when the selected audio mode is in effect. Based on such processing (and/or determination based thereon), data may be generated, and the data may be used (e.g., communicated as control outputs 311 and/or 313) in controlling or adjusting user control elements that may be used in receiving user input that comprises selecting of applicable control settings. The storage circuit 320 may be operable to store and provide (e.g., when fetched) data pertaining to operations or functions of the system 300. For example, the storage circuitry 320 may be used in storing (and providing, when needed) data pertaining to management of settings selections.

In an example implementation and an example use scenario thereof, the user enters a selection of a particular audio mode of operation (e.g., shown as Mode_Sel 301 in FIG. 3). In this regard, audio systems may support one or more audio modes, which may be pertinent to the generation, processing, and/or outputting of audio signals thereby. Examples of audio modes may comprise mono mode (e.g., single channel based mode), stereo mode, surround movie mode, gaming mode, music mode, etc. The audio mode may dictate, for example, whether or not multiple channels are used (e.g., single channel vs. multiple channels), the number of channels when multiple channels are used (e.g., 3 channels, 5 channels, etc.), the characteristics of audio signals in each of the channels, etc.

The audio mode may be entered, for example, via (or derived from user interactions with) user controls, which may be incorporated into one or more elements in the audio system, such as in one or more of elements 212 of the headset 200 of FIGS. 2A-2C). For example, the user may specify a new selection for the audio mode Mode_Sel 301 by turning an audio mode knob or dial.

In a similar manner, control settings, pertaining to particular characteristics of audio signals, may be selected or specified by the user. For example, equalization (EQ) may be applied during generation and/or processing of audio signals (for output). In this regard, equalization may be used to alter frequency response in the audio system, such as by use of linear filters. The user may be able to enter selection of such control settings (e.g., EQ settings), via (or based on) interactions with user controls incorporated into one or more elements in the audio system—e.g., one or more of elements 212 of the headset 200. The range of control (e.g., EQ) settings supported in the system may be large, comprising, e.g., a large number of different settings. Some of these control settings, however, may not be applicable or available in each of the audio modes supported in the system, as the characteristics of or applicable to audio signals in particular audio modes may only be a sub-set of all characteristics of all possible audio signals. For example, audio signals in particular channels, in particular audio modes, may only vary within a frequency range that is smaller than the overall frequency range of all possible audio signals that can be outputted by the audio system.

Thus, when interacting with the user control corresponding to such control settings, the user may still need to go through values that would not be applicable, or may be allowed to enter a selection that may result in undesirable effects. Accordingly, use of adaptive settings management may obviate such issues by allowing for intelligent determination of settings that are applicable based on the current audio mode (as entered via the mode_sel 301 input). The settings processing circuit 310 may select based on the audio mode, for example, a subset of all available control settings, which may then be provided (e.g., as control output 311) to allow configuring or controlling user control in manner that only allow selecting applicable or available settings.

Data pertaining to or used by the adaptive settings management may be pre-programmed into the system 300—e.g., stored in the storage circuit 320, and provided thereby, when needed, to the settings processing circuit 310 via control signal 321. Such pre-programmed data may be determined or obtained based on testing of the audio systems—e.g., operating it in each of the different/supported audio modes, and determining applicable valid (and/or desirable settings) in each audio mode (and/or for each channel). Alternatively, data pertaining to or used by the adaptive settings management may be obtained dynamically. For example, the data may be obtained based on user input (e.g., specifying 'desirable' settings for particular audio mode(s)), real-time operational data (e.g., relating to function of different components, such as within the processing path), and/or based on real-time characterization testing (e.g., using test audio files that may be used in the audio system). In this regard, the test audio files may be used, for example, to generate (or to control or adjust generation of) data pertinent to mapping of valid settings to possible audio modes. In this regard, the use of such audio test files may allow characterizing of audio output(s) in each audio mode. The resultant data is then used to populate the characterization structures used in the system 300.

In an example implementation, the adaptive settings management scheme, used in determining valid/applicable control settings based on audio modes, may be configured as matrixed based mapping. In this regard, data used in controlling selection of applicable control setting for each of the supported audio modes may be structured as (or stored using) a matrix. For example, assuming that the audio system supports M audio modes ('M' is positive non-zero integer), each of the audio modes may be assigned a unique identifier (between 1 and M). Assuming that the audio system supports X ('X' is positive non-zero integer) possible control (e.g., EQ) settings, each of the M audio modes may be allocated N ('N' is positive non-zero integer, with N≤X) suitable ones of the X control (e.g., EQ) settings for selection therefrom when operating in the corresponding audio mode. Thus, an M×N matrix may be defined, with each of the M rows corresponding to one of the M audio modes (correlated to the unique identifier 1-through-M allocated thereto), with values in that row representing applicable control settings for that mode. An example of such M×N matrix is shown:

$$\begin{bmatrix} a_{11} & a_{12} & \cdots & a_{1n} \\ a_{21} & a_{22} & \cdots & a_{2n} \\ \vdots & \vdots & \ddots & \vdots \\ a_{m1} & a_{m2} & \cdots & a_{mn} \end{bmatrix}$$

where each of the coefficients: $a_{11} \ldots a_{1n}; \ldots; a_{m1} \ldots a_{mn}$ are assigned a value between 1 and X (or 0, such as to allow allocating less than N valid settings to particular mode).

The matrix may be stored in the storage circuit 320, and data therein may be read by the settings processing circuit 310 (via control signal 321) when determining valid control setting for particular audio mode. Further, the valid control settings assigned to a particular mode may be adjusted simply by modifying the corresponding coefficient(s) in the row corresponding to that audio mode.

In an example implementation, the size of the matrix may be adjusted (e.g., by modifying the M and N values). This may allow configuring the matrix to accommodate changes in the systems (e.g., increase or decrease in the support audio modes and/or control settings).

In an example implementation, multiple matrices may be used, such as to allow adaptive (concurrent) management of different control settings. For example, one matrix may be used to facilitate management of EQ settings while another matrix may be used for another control setting (e.g., balance).

In an example implementation, users' selections (e.g., for each audio mode) may be recorded. The management scheme may then use that recoded information to enhance performing—e.g., adaptively adjusting settings selections for associated audio modes, such as by including previously selected settings for the corresponding audio mode, ranking previously selected setting(s) ahead of other settings, etc.

Figure 4:
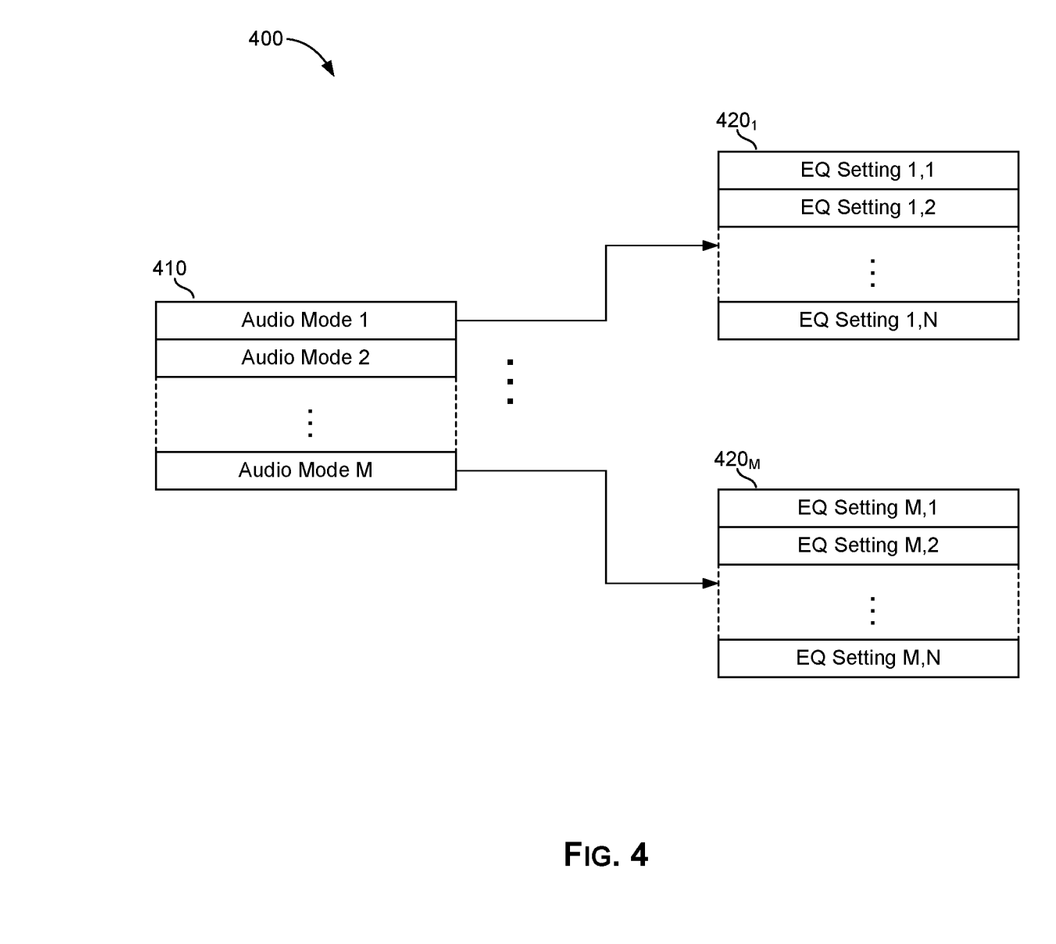
FIG. 4 depicts an example data structure for use in adaptive management of audio settings, in accordance with the present disclosure.

FIG. 4 depicts an example data structure for use in adaptive management of audio settings, in accordance with the present disclosure. Shown in FIG. 4 is data structure 400, which may be used during adaptive management of audio settings.

The data structure 400 may be designed and/or configured such that it may be used in implementing adaptive management schemes (e.g., of audio settings). In particular, the data structure 400 may allow implementing a multi-level, hierarchical settings selection scheme, where a selection made at first level (e.g., of audio mode) dictates applicable settings selection in subsequent level(s) (e.g., a second level). The data structure 400 may comprise a plurality of data sub-structures that may be populated with data for enabling implementation of the adaptive multi-level hierarchical selection scheme.

For example, the data structure 400 may be used in implementing a matrixed audio setting scheme, such as the one described in FIG. 3. In this regard, the audio structure 400 may be configured in the storage circuit 320 of FIG. 3, and used thereafter in the operations relating to management of audio settings. In particular, as shown in the example implementation depicted in FIG. 4, the data structure 400 may comprise an audio mode data sub-structure 410 and one or more audio setting data sub-structures 420. The audio mode data sub-structure 410 may be used in storing data pertaining to supported audio modes. For example, with reference to the M×N matrix based implementation described in FIG. 3, the audio mode data sub-structure 410 may comprise M elements, each corresponding to one of the M supported audio modes. Each of the M elements in the audio mode data sub-structure 410 may be used in storing information relating to a corresponding audio mode. The information may comprise such things as identification information associated with the audio mode (e.g., associated selection setting in the corresponding user control(s); associated tag, such as "mono," "stereo," etc.), data pertaining to operations associated with the audio mode (e.g., parameters used in the processing path, etc.), etc. Also included is information that identifies (e.g., as link or pointer to memory location of) corresponding one of the audio setting data sub-structures 420 (of which M instances may be used in the M×N matrix based implementation, shown as audio setting data sub-structures $420_1$-$420_M$ in FIG. 4).

Each audio setting data sub-structure $420_i$ (one the audio setting data sub-structures $420_1$-$420_M$) may be used in storing information relating to audio settings applicable and/or available in the associated audio mode (e.g., the audio mode corresponding to the ith element in the audio mode data sub-structure 410). The audio setting data sub-structures 420 may be configured to store information relating to each of the applicable settings. For example, with reference to the M×N matrix based implementation described in FIG. 3, each audio setting data sub-structure $420_i$ may comprise N elements, corresponding to each one of N (possibly) applicable audio settings for each audio mode, with each of the N elements being used in storing information relating to the corresponding one of the N applicable audio settings. The information may comprise such things as identification information associated with the audio setting (e.g., associated selection setting in the corresponding user control(s); associated tag, such as "horror," "action," "dance," etc.), data pertaining to operations associated with the audio setting (e.g., parameters used in the processing path, etc.), and the like.

Figure 5:
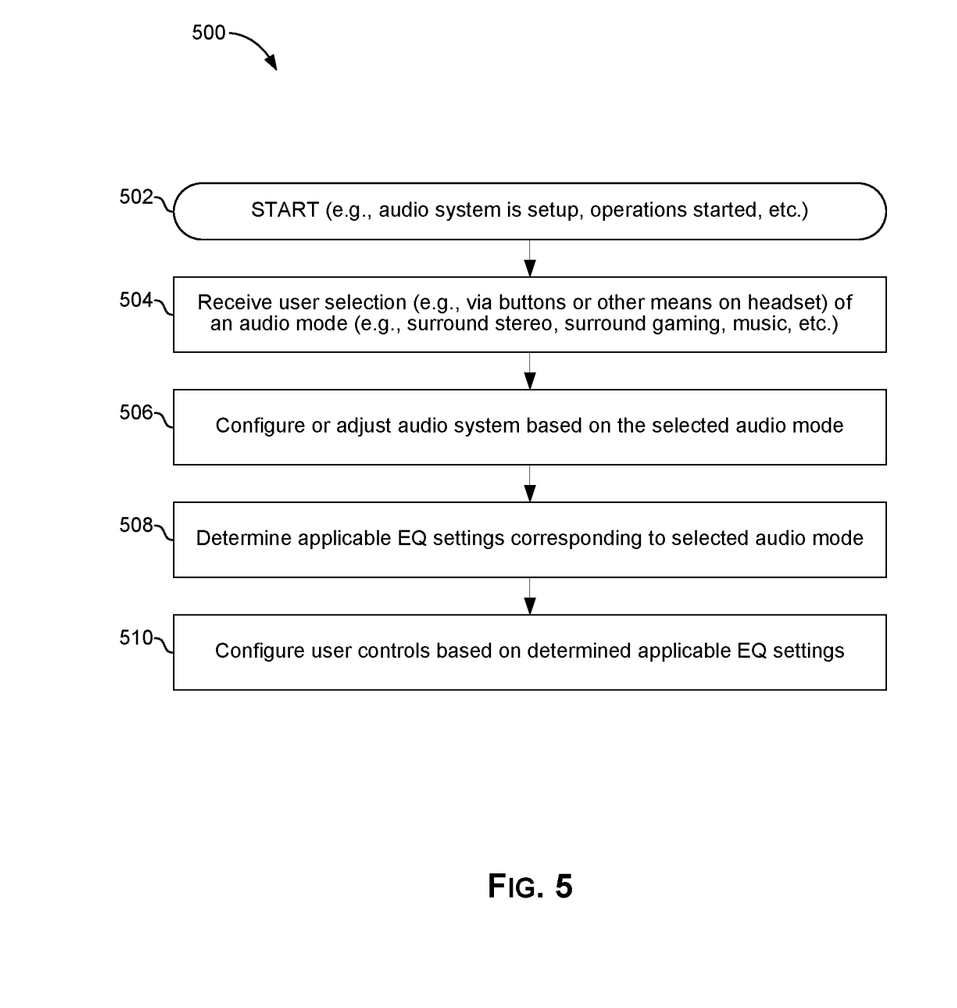
FIG. 5 depicts a flowchart of an example process for matrixed audio settings management during audio operations.

FIG. 5 depicts a flowchart of an example process for matrixed audio settings management during audio operations. Shown in FIG. 5 is flow chart 500, which comprises a plurality of example steps (502-510) that may be performed to enable adaptive management of settings selection in an audio system (e.g., system 300 of FIG. 3).

In step 502, at a start state, an audio system (e.g., arrangement 100 of FIG. 1) is setup (e.g., connections are setup between various elements of the arrangement, which may comprise a game console, a game controller, and headset), and operations (e.g., gaming, chatting, etc.) are started.

In step 504, user input is received (e.g., via controls on a headset), for selections of an audio mode (e.g., mono, stereo, surround movie, gaming, music, etc.)

In step 506, the audio system may be configured and/or adjusted to operate in the selected audio mode. This may comprise configuring and/or adjusting audio processing resources, audio output resources, etc.

In step 508, based on processing of the user's selection of the audio mode, corresponding applicable (e.g., valid and/or desirable) control settings may be determined. This may be done, for example, using a matrixed based implementation, as described above. Use of such implementation may enhance user experience as the user will only need to select using a sub-set of all possible settings (avoiding need to cycle through what may be inapplicable (or undesirable) values.

In step 510, user controls may be configured to allow selecting between (only) applicable settings, as determined in the previous step.

While the various implementations disclosed herein are described in conjunction with chat-and-game audio, it should be understood that the disclosure is not necessarily so limited, and that similar approach may be used to enhance off-screen sounds in other use scenarios.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method comprising:
   in an audio system that comprises at least one audio output element configured to output audio signals:
   receiving a first user input that comprises a selection of an audio mode from one or more audio modes supported in the audio system;
   determining based on the selected audio mode and mapping data, one or more audio settings from a plurality of audio settings supported in the audio system,
   wherein the one or more audio settings are used during generating, processing, and/or outputting of the audio signals,
   wherein the mapping data defines for each supported audio mode, valid values for each of corresponding one or more audio settings from the plurality of audio settings, and
   wherein the valid values for at least one audio setting of the one or more audio settings correspond to only a subset of all values available in the system for the at least one audio setting; and
   configuring at least one user control element to enable a second user input that comprises a selection between the one or more audio settings based on the defined valid values, wherein:
   the configuring comprises adjusting operation of the at least one user control element, and
   the adjusting comprises:
   enabling for selection or setting, via the at least one user control element, values for the second user input that match or correspond to the valid values for each of the corresponding one or more audio settings, and
   for the at least one audio setting, disabling or preventing selection of or setting to any of remaining ones of all values available in the system.

2. The method of claim 1, comprising pre-programming the mapping data.

3. The method of claim 1, comprising setting and/or adjusting the mapping data based on one or more of: data, real-time data, and/or user input.

4. The method of claim 1, wherein the one or more audio settings comprise equalization (EQ) settings.

5. The method of claim 1, wherein the selected audio mode comprises one of a plurality of supported audio modes in the audio system.

6. The method of claim 5, wherein the plurality of supported audio modes comprise stereo mode, surround movie mode, surround gaming mode, and surround music mode.

7. The method of claim 1, wherein the audio output element is a headset.

8. A system comprising:
   one or more circuits that are used in controlling generation, processing, and/or outputting of audio signals in the system, the one or more circuits being configured to:
   receive a first user input that comprises a selection of an audio mode from one or more audio modes supported in the system;
   determine based on the selected audio mode and mapping data, one or more audio settings from a plurality of audio settings applicable in the system,
   wherein the one or more audio settings are used during generating, processing, and/or outputting of the audio signals,
   wherein the mapping data defines for each supported audio mode, valid values for each of corresponding one or more audio settings from the plurality of audio settings, and
   wherein the valid values for at least one audio setting of the one or more audio settings correspond to only a subset of all values available in the system for the at least one audio setting; and configure at least one user control element to enable a second user input that comprises a selection between the one or more audio settings based on the defined valid values, wherein:

the configuring comprises adjusting operation of the at least one user control element, and the adjusting comprises:

enabling for selection or setting, via the at least one user control element, values for the second user input that match or correspond to the valid values for each of the corresponding one or more audio settings, and for the at least one audio setting, disabling or preventing selection of or setting to any of remaining ones of all values available in the system.

9. The system of claim 8, wherein the one or more circuits are configured to enable pre-programming the mapping data.

10. The system of claim 8, wherein the one or more circuits are configured to set and/or adjust the mapping data based on one or more of: data, real-time data, and/or user input.

11. The system of claim 8, wherein the one or more audio settings comprise equalization (EQ) settings.

12. The system of claim 8, wherein the selected audio mode comprises one of a plurality of supported audio modes in the system.

13. The system of claim 12, wherein the plurality of supported audio modes comprise stereo mode, surround movie mode, surround gaming mode, and surround music mode.

14. The system of claim 12, wherein the system comprises or is component of a headset.

15. A system comprising:

a headset that comprises one or more user control elements; and circuitry for controlling operation of the headset, the circuitry being configured to:

receive, via the one or more user control elements, a first user input that comprises a selection of an audio mode from one or more audio modes supported in the system;

determine based on the selected audio mode and mapping data, one or more audio settings from a plurality of audio settings supported in the system, wherein the one or more audio settings are used during generating, processing, and/or outputting of the audio signals, wherein the mapping data defines for each supported audio mode, valid values for each of corresponding one or more audio settings from the plurality of audio settings, and wherein the valid values for at least one audio setting of the one or more audio settings correspond to only a subset of all values available in the system for the at least one audio setting; and configure at least one of the one or more user control elements of the headset to enable a second user input that comprises a selection between the one or more audio settings based on the defined valid values, configure at least one user control element to enable a second user input that comprises a selection between the one or more audio settings based on the defined valid values, wherein:

the configuring comprises adjusting operation of the at least one of the one or more user control elements, and the adjusting comprises:

enabling for selection or setting, via the at least one of the one or more user control elements, values for the second user input that match or correspond to the valid values for each of the corresponding one or more audio settings, and for the at least one audio setting, disabling or preventing selection of or setting to any of remaining ones of all values available in the system.

16. The system of claim 15, wherein the mapping data is pre-programmed.

17. The system of claim 15, wherein the mapping data is set and/or adjusted based on one or more of: data, real-time data, and/or user input.

18. The system of claim 15, wherein the one or more audio settings comprise equalization (EQ) settings.

19. The system of claim 15, wherein the selected audio mode comprises one of a plurality of supported audio modes in the system.

20. The system of claim 19, wherein the plurality of supported audio modes comprise stereo mode, surround movie mode, surround gaming mode, and surround music mode.

* * * * *